US012639099B2

(12) United States Patent　(10) Patent No.:　US 12,639,099 B2
Walsh et al.　(45) Date of Patent:　May 26, 2026

(54) APPARATUS AND METHOD FOR ASSIGNING GROUP COMPUTATIONAL TASKS IN A SAFETY-CRITICAL ENVIRONMENT

(71) Applicant: Parry Labs, LLC, Alexandria, VA (US)

(72) Inventors: David Walsh, Alexandria, VA (US); Charles Adams, Cedar Rapids, IA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/910,563

(22) Filed: Oct. 9, 2024

(65) Prior Publication Data

US 2026/0099350 A1　Apr. 9, 2026

(51) Int. Cl.
G06F 9/455　(2018.01)

(52) U.S. Cl.
CPC .. G06F 9/45558 (2013.01); *G06F 2009/4557* (2013.01); *G06F 2009/45579* (2013.01)

(58) Field of Classification Search
CPC ......... G06F 9/45558; G06F 2009/4557; G06F 9/44; G06F 9/54; G06F 11/34; G06F 15/177; G06F 2009/45579; G06N 20/00; H04L 67/10
See application file for complete search history.

(56) References Cited

U.S. PATENT DOCUMENTS

| 2020/0201679 | A1* | 6/2020 | Wentz ..................... G06F 9/468 |
| 2020/0310394 | A1* | 10/2020 | Wouhaybi ........... H04L 67/1051 |
| 2022/0124005 | A1* | 4/2022 | Doshi ................... G06F 1/3228 |
| 2023/0070361 | A1* | 3/2023 | Papadopoulou .. H03M 13/6561 |
| 2023/0084918 | A1* | 3/2023 | Wiegman ................. G08G 5/55 |
| | | | 701/3 |
| 2024/0028381 | A1* | 1/2024 | He ....................... G06F 9/45558 |
| 2024/0348592 | A1* | 10/2024 | Fraser Brown ....... H04L 63/101 |

* cited by examiner

*Primary Examiner* — Kenneth Tang
(74) *Attorney, Agent, or Firm* — Caldwell LLC

(57)　ABSTRACT

An apparatus and method for assigning group computational tasks in a safety-critical environment. The apparatus includes at least a processor and a memory communicatively connected to the at least a processor. The memory instructs the processor to receive an identification of a software module to be executed, communicatively connect to a remote computing device, configure the remote computing device to instantiate the software module within a virtual environment executing on the remote computing device, transmit an input for the software module to the remote computing device, and receive an output of the software module from the remote computing device.

20 Claims, 8 Drawing Sheets

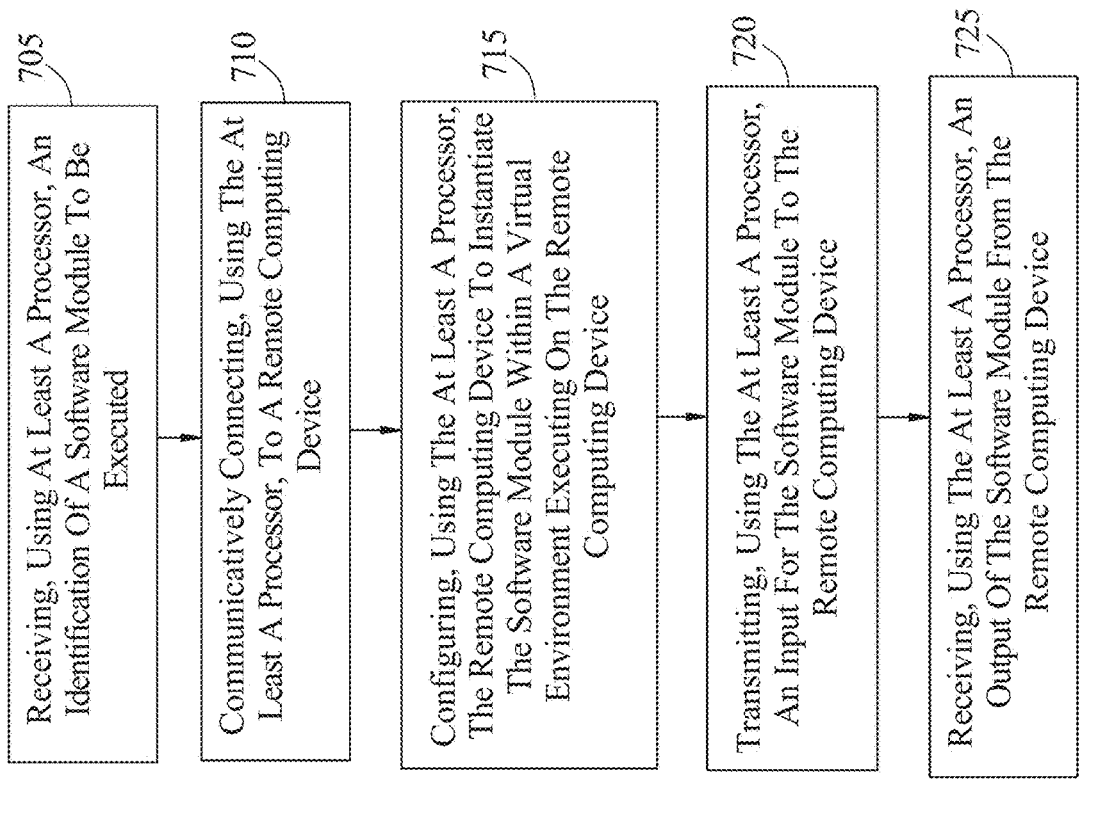

FIG. 7

705 Receiving, Using At Least A Processor, An Identification Of A Software Module To Be Executed 710 Communicatively Connecting, Using The At Least A Processor, To A Remote Computing Device 715 Configuring, Using The At Least A Processor, The Remote Computing Device To Instantiate The Software Module Within A Virtual Environment Executing On The Remote Computing Device 720 Transmitting, Using The At Least A Processor, An Input For The Software Module To The Remote Computing Device 725 Receiving, Using The At Least A Processor, An Output Of The Software Module From The Remote Computing Device

700

APPARATUS AND METHOD FOR ASSIGNING GROUP COMPUTATIONAL TASKS IN A SAFETY-CRITICAL ENVIRONMENT

FIELD OF THE INVENTION

The present invention generally relates to the field of group computing. In particular, the present invention is directed to an apparatus and a method for assigning group computational tasks in a safety-critical environment.

BACKGROUND

In modern group computing systems, the ability to dynamically scale computational power is important, specifically in safety-critical environments. Currently, group computing systems face significant challenges in dynamically scaling computational resources, particularly in environments that require real-time decision-making with high reliability. These systems typically lack robust methods for ensuring secure communication and task distribution across various remote computing devices.

SUMMARY OF THE DISCLOSURE

In an aspect, an apparatus for assigning group computational tasks in a safety-critical environment includes at least a processor and a memory communicatively connected to the at least a processor. The memory contains instructions configuring the processor to receive an identification of a software module to be executed, communicatively connect to a remote computing device, configure the remote computing device to instantiate the software module within a virtual environment executing on the remote computing device, transmit an input for the software module to the remote computing device, and receive an output of the software module from the remote computing device.

In another aspect, a method for assigning group computational tasks in a safety-critical environment includes receiving, using at least a processor, an identification of a software module to be executed, communicatively connecting, using the at least a processor, to a remote computing device, configuring, using the at least a processor, the remote computing device to instantiate the software module within a virtual environment executing on the remote computing device, transmitting, using the at least a processor, an input for the software module to the remote computing device, and receiving, using the at least a processor, an output of the software module from the remote computing device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a block diagram of an exemplary method for assigning group computational tasks in a safety-critical environment;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for assigning group computational tasks in a safety-critical environment. The apparatus includes at least a computing device comprised of a processor and a memory communicatively connected to the processor. The memory instructs the processor to receive an identification of a software module to be executed. The processor communicatively connects to a remote computing device. The processor configures the remote computing device to instantiate the software module within a virtual environment executing on the remote computing device. Additionally, the processor transmits an input for the software module to the remote computing device. The processor receives an output of the software module from the remote computing device.

Figure 1:
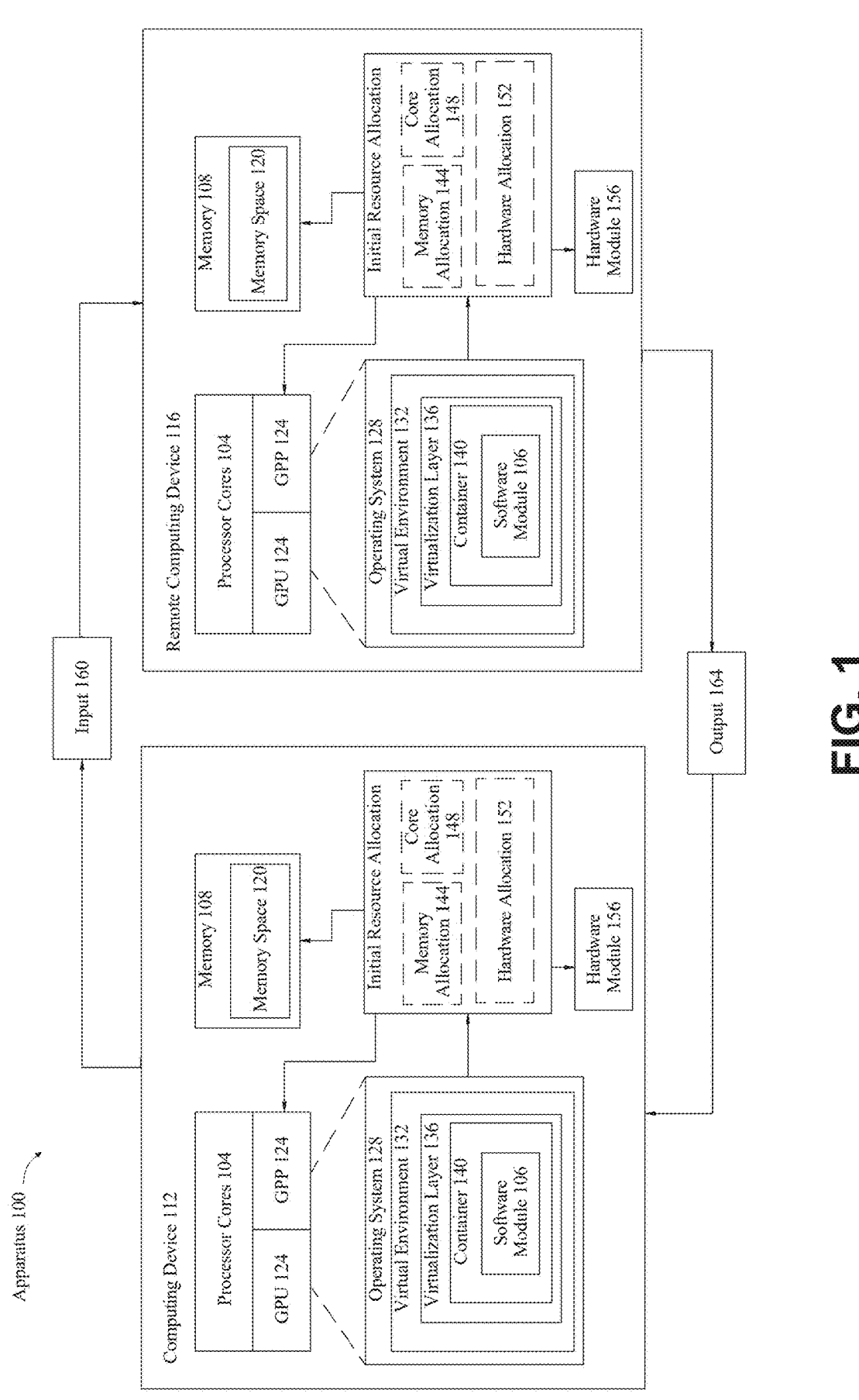
FIG. 1 is a block diagram of an apparatus for assigning group computational tasks in a safety-critical environment.

Referring now to FIG. 1, an exemplary embodiment of apparatus 100 for assigning group computational tasks in a safety-critical environment is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device 112, instructions and/or information may be transmitted to primary memory wherein information may be processed. In one or more embodiments, information may only be populated within primary memory while a particular software is running. In one or more embodiments, information within primary memory is wiped and/or removed after the computing device 112 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system 128 and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device 112 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device 112. In one or more embodiments, server may be configured to perform one or more processes as described below to allow for increased computational power and/or decreased power usage by the apparatus 100 computing device 112. In one or more embodiments, computing device 112 may transmit processes to server wherein computing device 112 may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device 112 operating independently, or may include two or more computing devices operating in concert, in parallel, sequentially or the like; two or more computing devices may be included together in a single computing device 112 or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 112. Processor 104 may include but is not limited to, for example, a computing device 112 or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device 112, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores 104, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the at least a processor 104 is configured to receive an identification of a software module 106 to be executed. As used in this disclosure, a "software module" is a discrete, independent unit of software functionality that can be executed within a computing environment. Without limitation, the software module 106 may be integrated with other modules or systems. Without limitation, the software module 106 may be executed by the at least a processor 104 within a computing environment, which may include local devices or remote systems such as virtual environments. Without limitation, the at least a processor 104 may identify the software module 106 via a user input or another system component. Continuing, the identification may be a reference, name, or unique identifier for the module stored in a database or memory. Without limitation, the at least a processor 104 may identify the software module 106 via external devices through user interfaces (such as a command-line or GUI) and/or through communication protocols with other systems (e.g., cloud services or servers). Continuing, the at least a processor 104 may look up the software module 106 in a registry or memory where the available software modules 106 are stored or cataloged. Continuing, the at least a processor 104 may match the received identification of the software module 106 to the corresponding module for execution.

Still referring to FIG. 1, the at least a processor 104 is configured to communicatively connect to a remote computing device 116. As used in this disclosure, a "remote computing device 116" is a computing system that is physically located away from the main processor 104 and can be communicated with a network and or data link. In a non-limiting example, communication with the remote computing device 116 may be established through network protocols, such as TCP/IP, 5G, Wi-Fi, satellite communication, and the like. Without limitation, the remote computing device 116 may receive, process, and return data, such as executing software modules 106, processing tasks, storing information, and the like.

With continued reference to FIG. 1, a remote computing device 116 may also be referred to as a node. As used in this disclosure, a "node" is a distinct point or device within a network, system, or computational framework that can receive, process, or transmit data. In a non-limiting example, a node may serve a variety of roles. For instance, without limitation, the node may provide computation, communication, storage, or control. In another non-limiting example, the node may function as critical components of larger systems like distributed computing networks, sensor networks, or communication infrastructures.

With continued reference to FIG. 1, the at least a processor 104 may scan a plurality of nodes by detecting, identifying, and assessing various devices of points in a network or system. Without limitation, this may involve several steps and/or techniques depending on the type of network and/or node involved. For example, the at least a processor 104 may perform a network discovery phase. Continuing, the at least a processor 104 may actively search for available nodes in the system using ping sweeps, network probing, or broadcasting discovery requests across the network. As used herein, a "ping sweep" is a network scanning technique used to determine which IP addresses within a specified range are active or responsive. Without limitation, the ping sweep may be done by sending ICMP (Internet Control Message Protocol) echo requests (pings) to multiple IP addresses and awaiting responses. In this example, an IP address that responds indicates the presence of an active device (a node). As used herein, "network probing" is a method used to gather information about nodes in a network. Without limitation, network probing may provide information such as a node's status, capabilities, and network paths. Continuing, network probing may include pinging devices, testing open ports, and/or sending specially crafted packets to get detailed information about the devices. As used herein, a "discovery request" is a type of message broadcast or sent over a network to solicit responses from available devices. Continuing, the responding devices may provide their identity and capabilities. Without limitation, the discovery request may be used in service discovery protocols like DNS-SD (DNS Service Discovery) or UPnP (Universal Plug and Play) to allow devices to announce themselves or locate other services on the network.

With continued reference to FIG. 1, in another non-limiting example, the at least a processor 104 may perform a node identification processes once the presence of at least a node has been detected. This may include retrieving an IP address of the node, the node type, and/or the node capabilities. Continuing, the at least a processor 104 may identify the node using Simple Network Management Protocol (SNMP) and/or Service Discovery Protocol (SDP) to query the node for information. In a non-limiting example, the at least a processor 104 may gather information regarding processing power of the node, storage capacity of the node, and/or current load of the node.

With continued reference to FIG. 1, in another non-limiting example, the at least a processor 104 may perform an evaluation on the identified nodes. For instance, the at least a processor 104 may evaluate a plurality of metrics of the node such as, without limitation, the network bandwidth, latency, computational resources, and the like. Continuing, the at least a processor 104 may continuously monitor the node after the initial scan to dynamically adapt to changes, such as the node becoming unavailable of new nodes joining the system.

With continued reference to FIG. 1, connecting to the remote computing device 116 may be based on a spatial datum. As used in this disclosure, a "spatial datum" is a data point or set of data that represents the position, orientation, or geographical location of an object or event in space, and/or its relative position and distance from another point, such as a distance from or position relative to apparatus 100, which may be determined by a strength of a signal from remote computing device 116 to apparatus and/or one or other transmitters and/or receivers, using network signal times, using reported geographical positions, or the like. Without limitation, the spatial data may be used to define where something is located or how it is situated in relation to other objects in a given environment. In a non-limiting example, spatial datum may be used to identify suitable devices for inclusion in a group computing system by determining their geographic location and proximity to other remote computing device 116*s* also referred to as a node. Continuing, this approach may allow a system to expand its computing power dynamically by selecting nearby nodes based on spatial data, which helps optimize performance by reducing latency and increasing data transfer efficiency. Without limitation, by leveraging proximity, the system may be able to quickly scale its resources by including devices that are geographically closer and more capable of handling computational tasks.

In another non-limiting example, spatial data may be used to efficiently distribute tasks to edge computing hardware, including nearby vehicle computing systems. Continuing, the system may analyze spatial datum, such as GPS coordinates, to identify the closest available vehicles equipped with processing power and task them with offloading computational processes, as discussed further herein. Without limitation, by sending data to proximate nodes, the system reduces the time required for processing and enhances the overall speed of task execution. Continuing with the previous non-limiting example, spatial data may play a critical role in safety-critical environments by allowing the system to share and scale processing power among various nodes using data links and satellites. Without limitation, the spatial datum may help the system maintain low-latency communication between proximate nodes, ensuring that critical tasks are processed in real-time. Continuing, this may be important in environments like autonomous vehicles or healthcare, where rapid decision-making and real-time data processing are essential. In an embodiment, without limitation, spatial data may also support failover mechanisms by ensuring that if a node fails, another nearby node can immediately take over its computational tasks. Continuing, the system may use spatial data to locate the next best node for task reassignment, thus ensuring continuity and reliability in group computing systems. Without limitation, spatial data may enhance the system's ability to maintain a secure and efficient distributed computing network.

With continued reference to FIG. 1, connecting to the remote computing device 116 may be based on latency datum. As used in this disclosure, a "latency datum" is data that measures the time delay, or latency, experienced in transmitting data between two points in a network. In a non-limiting example, when determining the best remote computing device 116 to connect to, the system may analyze the latency between the local processor 104 and potential remote computing device 116*s*, prioritizing connections with the lowest latency for faster, real-time processing. Without limitation, prioritizing the remote computing device 116*s* based on a latency datum may allow the system to ensure efficient communication and minimal delays, especially in time-sensitive operations such as distributed computing or real-time data processing. In another non-limiting example, the latency datum may be critical in safety-critical environments because even slight delays may impact decision-making. For example, without limitation, the at least a processor 104 may constantly analyze and adjust, based on real-time latency data, the system dynamically and select the optimal remote computing device 116 to maintain high performance and reliability.

In a non-limiting example, the at least a processor 104 may be configured to prioritize lower latency responding remote computing device 116*s* by measuring the latency datum. Continuing, this measurement may include metrics such as network response times and round-trip delays, allowing the at least a processor 104 to assess the efficiency of communication with various remote computing device 116*s*. Continuing, once the latency data is collected, the at least a processor 104 may analyze and compare the latency between different remote computing device 116*s*. For instance, the at least a processor 104 may ping multiple remote computing device 116*s* or monitor real-time network conditions to determine which remote computing device 116 has the lowest latency. Without limitation, by prioritizing remote computing device 116*s* with lower latency, the at least a processor 104 may ensure that data is transmitted quickly, optimizing real-time processing and reducing delays in time-sensitive tasks such as distributed computing. Without limitation, the at least processor 104 may continuously analyze latency data in environments where network conditions fluctuate, dynamically adjusting its connection strategy to always select the most efficient remote computing device 116. In a non-limiting example, if latency increases for one remote computing device 116, the at least a processor 104 may shift to another remote computing device 116 with a more favorable latency profile, ensuring continuous and effective task processing. Continuing, in safety-critical applications, the at least a processor 104 ability to constantly monitor and adjust based on real-time latency data ensures that critical tasks are assigned to the most responsive remote computing device 116 which may help mitigate risks associated with delays and maintain system reliability and performance.

With continued reference to FIG. 1, the remote computing device 116 comprises a vehicle-based computing unit. As used in this disclosure, a "vehicle-based computing unit" is a computing system embedded within or connected to a vehicle, capable of performing processing tasks, managing data, and supporting communication with other systems or networks. In a non-limiting example, the vehicle-based computing unit may be designed to leverage the vehicle's onboard computational resources, such as CPUs, GPU 124*s*, and storage, to handle tasks related to navigation, data analysis, real-time decision-making, and the like. Without limitation, the vehicle-based computing unit may operate independently or as part of a larger network, communicating with one or more remote computing device 116 or cloud services for distributed processing. In a non-limiting example, the vehicle-based computing unit may be installed in an autonomous car. Continuing, the vehicle-based computing unit may process sensor data from cameras, LiDAR, and GPS to make real-time decisions about navigation, obstacle avoidance, and route optimization. Continuing, the at least a processor 104 within the vehicle-based unit may analyze data locally to reduce latency and improve safety, while also communicating with remote servers or other vehicles to exchange traffic and environmental information. In another non-limiting example, a drone may be equipped with a vehicle-based computing unit to manage flight navigation, real-time communication with central control servers, and the like. Continuing, the vehicle-based computing unit may process flight path data, monitor weather conditions, adjust the drone's route in response to obstacles or delays, and the like.

With continued reference to FIG. 1, the remote computing device 116 may include a hypervisor configured to host at least a virtual machine within the virtual environment 132 of the remote computing device 116, dynamically allocate at least a resource from the at least a virtual machine based on a plurality of requirements of the input 160 for the software module 106, and manage an execution of the at least a virtual machine of the remote device. A "hypervisor" for the purposes of this disclosure is a software module 106 which is configured to create and manage virtual machines. In one or more embodiments, hypervisor may create one or more virtual machines, as defined herein, wherein each virtual machine may host a sperate and isolated virtual environment 132. In one or more embodiments, each virtual environment 132 may contain a separate and isolated operating system 128. In one or more embodiments, a hypervisor may run on the host operating system 128 wherein the hypervisor may generate virtual machines on the host operating system 128. In one or more embodiments, a hypervisor may run directly on the hardware of a computing device without reliance on an operating system 128. In one or more embodiments, a hypervisor that runs independent of a host operating system 128 may be referred to as a "Type 1" and/or "bare metal" Hypervisor. In one or more embodiments, in a bare metal hypervisor, the hypervisor is directly installed on the hardware of computing device rather than through the operating system 128. In one or more embodiments, a type 1 hypervisor may partition resources, such as memory processing power and the like for each virtual machine. In one or more embodiments, virtual machines may communicate directly with the hardware of computing device rather than the host operating system 128. In one or more embodiments, in a bare metal hypervisor virtual machines are not susceptible to issues caused by the host operating system 128 and/or other virtual machines. In one or more embodiments, virtual machines may be isolated and unaware that other virtual machines exist. In one or more embodiments, a bare metal hypervisor may allow for increased performance wherein virtual machines may communicate directly with hardware rather than through the intermediate host operating system 128. In one or more embodiments, a bare metal hypervisor may allow multiple virtual machines to run simulates wherein failure of one virtual machine may not result in a failure of a second virtual machine. In one or more embodiments, in a type 2 hypervisor, partitioning and resource allocation may occur above the host operating system 128 layer, whereas in a type 1 hypervisor partitioning may occur below the host operating system 128 and directly with the hardware of computing device. In one or more embodiments, in a type 2 hypervisor, virtual environments may rely on the host operating system 128 for proper resource allocation and memory allocation 144 whereas in a type 1 hypervisor, virtual environments may only rely on the hardware.

In one or more embodiments, hypervisor may include a software configured as a virtual machine monitor (virtual machines). In some cases, hypervisor may be configured to allow a physical machine (host) such as computing device to run a plurality of operating systems 128 simultaneously by virtualizing system hardware e.g., processors, memory, I/O devices, and/or the like. In a non-limiting example, hypervisor may create one or more virtual machines wherein each virtual machine may host a sperate and isolated software operating environment (SOE). In some cases, hypervisor may run directly on the hardware of computing device without reliance of an operating system 128. Instantiating hypervisor may include launching or initializing hypervisor in host operating system 128. In some cases, instantiation of hypervisor may create virtual environment 132 wherein a plurality of partitions (i.e., virtual machines) can be run and managed. In an embodiment, hypervisor may include a "type 1 hypervisor" that may run independently of host operating environment. In a non-limiting example, hypervisor may include a bare metal hypervisor that runs directly on the computing device 112 hardware and manages one or more quest operating systems 128. Exemplary type 1 hypervisor may include, without limitation, MICROSOFT HYPER-V, VMWARE ESXI, XEN, and/or the like. In some cases, virtual machines created by type 1 hypervisor may communicate directly with the hardware of computing device rather than host operating system 128. In some cases, virtual machines created by type 1 hypervisor may not be susceptible to issues caused by the host operating system 128 and/or other virtual machines in virtual environment 132. In a non-limiting example, one or more virtual machines may be isolated and unaware of existence of other virtual machines. In an embodiment, type 1 hypervisor may allow for an increased performance wherein virtual machines within virtual environment 132 may communicate directly with hardware rather than through the intermediate host operating system 128. In a non-limiting example, type 1 hypervisor may allow one or more virtual machines to run simultaneously, wherein the failure of a first virtual machines may not result in a failure of a second virtual machines.

With continued reference to FIG. 1, in another embodiment, hypervisor may include a "type 2 hypervisor" that runs atop host operating system 128 similar to any other software applications. In one or more embodiment, hypervisor may include a hosted hypervisor having resource allocation occurred right above host operating system 128. In some cases, type 2 hypervisor may rely on host operating system 128 of computing device, whereas in type 1 hypervisor as described above, may only rely on the hardware of computing device. Exemplary type 2 hypervisor may include, without limitation, VMWARE WORKSTATION, ORACLE VIRTUAL BOX, and/or the like. In some cases, when instantiating type 2 hypervisor, processor 104 may launch type 2 hypervisor that has been pre-installed similar to launching any software application. Once host OS is up and running, processor 104 may then start type 2 hypervisor to create, manage and run virtual machines atop the host OS; however, for type 1 hypervisor, since it runs directly on "bare metal" (i.e., hardware without requiring an underlying operating system), instantiating type 1 hypervisor may involve booting the system from a medium such as, without limitation, a USB drive, CD, or a network source containing hypervisor. Once booted, hypervisor may take control of at least a portion of hardware resources and manage and/or launch one or more virtual machines.

Still referring to FIG. 1, the at least a processor 104 is configured to configure the remote computing device 116 to instantiate the software module 106 within a virtual environment 132 executing on the remote computing device 116. As used in this disclosure, a "virtual environment" is a self-contained environment within a computing device that allows for the isolation of one or more software from the host operating system 128. For example, and without limitation, a virtual environment 132 may include a separate and isolated operating system 128 on computing device that does not interact with the host operating system 128. In one or more embodiments, virtual environment 132 may include an environment located on a virtual machine. Host operating system 128 includes a primary operating system 128 installed on a computing device hardware. In some cases, host operating system 128 may manage underlaying physical resources and facilitate the running of one or more guest operating systems (guest OS). In a non-limiting example, Linux operating system 128 running on computing device as the primary operating system 128 may be the host operating system 128. Software applications integrated to computing device as described herein may be run atop Linux operating system 128. In some cases, virtual environment 132 may be software-defined, for example, and without limitation, virtual environment 132 may include a simulated operating system 128 that operates independently of the underlaying physical hardware of computing device. In some cases, virtual environment 132 may emulate one or more hardware, software, networks, or a combination thereof. In a non-limiting example, a plurality of partitions may be allocated inside of virtual environment 132, wherein each partition may include a virtual machine (VM). "Virtual machine," for the purpose of this disclosure, is a software-based emulation of a computer system that is capable of running one or more software applications as if they were running on physical hardware. For instance, and without limitation, virtual environment 132 may include a separate and isolated operating system 128 on computing device that does not interact with host operating system 128.

In one or more embodiments, a virtual machine may be used to create and execute an operating system 128 that is separate and isolated from the host operating system 128. In one or more embodiments, virtual machine may allow for the creation of virtual environments. In one or more embodiments, generation of a virtual environment 132 may include allocation of memory space 120 on memory on computing device. "Memory allocation" for the purposes of this disclosure is the process of reserving computer space for a particular purpose, such as without limitation for a resource allocation and/or initial resource allocation. In one or more embodiments, memory may be allocated for generation of a virtual environment 132. In one or more embodiments, memory allocation 144 may be static wherein a predefined amount of space if reserved and cannot be modified. For example, and without limitation, in a static memory allocation 144, if a virtual environment 132 is given 2 gigabytes of memory, the memory cannot be increased or decreased. In one or more embodiments, memory allocation 144 may be dynamic wherein memory may be continuously increased based on the demands of the virtual environment 132. In one or more embodiments, memory may be allocated in order to ensure that a virtual environment 132 contains the proper amount of space in order to perform its intended functions. In one or more embodiments, creation of a virtual environment 132 may include creation of a guest operating system 128 using virtual machine.

In one or more embodiments, memory allocation 144 may include a process of reserving memory space 120 on the host operating system 128 for use within the virtual environment 132. In one or more embodiments, memory allocation 144 may further include partitioning of memory wherein the memory may be portioned into more than one parts. In one or more embodiments, memory may be partitioned into a root partition (also known as a parent partition) and one or more child partitions. The root partition may contain the operating system 128 while the child partitioning contain the virtual environments. In one or more embodiments, management of the child partitions may be done through the root partition. In one or more embodiments, computing device may be configured to partition memory into more than one or child partitions wherein each child partition may be associated with a separate software container 140. "Partition" for the purposes of this disclosure refers to a separated section of physical hardware on computing device. For example, and without limitation, a memory may be split into several partitions wherein each partition may be used for separate and distinct storage tasks. In one or more embodiments, one or more various physical hardware components may be partitioned such as but not limited to a processor, a primary memory, a secondary memory, a network device and the like. In one or more embodiments, partitioning may include the use of disk management software and/or other partitioning software that may allow for the splitting of a physical hardware component into one or more separate partitions.

With continued reference to FIG. 1, virtual environment 132 may be created on host operating system 128. In one or more embodiments, in instances where virtual environment 132 is generated on a host operating system 128, the virtual environment 132 must communicate with the host operating system 128 to receive resources such as computing power, memory space 120 and the like. In one or more embodiments, one or more virtual environments 132 may be generated using a hypervisor.

With continued reference to FIG. 1, processor 104 may then generate a virtualization layer 136 supervised by hypervisor, wherein a host operating system 128 within virtual environment 132 is operated by the virtualization layer 136. As used in this disclosure, a "virtualization layer" is a software layer (or interface) that sits between hardware layer (e.g., physical CPU, memory, I/O devices, and/or the like) and virtual environment 132 having one or more virtual machines. In some cases, virtualization layer 136 may be configured to virtualize the underlaying hardware resources and present the virtualized hardware resources to plurality of virtual machines as though they are dedicated to each virtual machine. In a non-limiting example, a plurality of partitions of a single physical hardware component as described herein may share the same physical hardware resources through virtualization layer 136, without being aware of each other. In some cases, virtualization layer 136 may be instantiated when hypervisor is booted or launched. In a non-limiting example, in case of a type 1 hypervisor, virtualization layer 136 may be generated when machine starts up since hypervisor directly interface with hardware. In another non-limiting example, in case of a type 2 hypervisor, virtualization layer 136 may be established once hypervisor software is initiated on top of host OS. In some cases, hypervisor may be configured to monitor and manage one or more hardware abstraction and allocate these virtualized resources to designated virtual machines. In a non-limiting example, virtualized resources may include CPU time, memory space 120, I/O operations and/or the like. In some cases, virtualized resources may be allocated based on partition policy as described in detail below. In some cases, hypervisor may manage the scheduling of virtual machines tasks on actual cores. In some cases, hypervisor may handle interruptions, exceptions, and any events that occur, deciding which virtual machines or service needs attention. In some cases, hypervisor may be configured to isolate one or more virtual machines from rest of virtual machines to maintain system security and stability. In other cases, hypervisor may be configured to manage lifecycle operations of one or more virtual machines such as, without limitation, creation, modification, deletion, migration, and/or the like.

With continued reference to FIG. 1, in one or more embodiments, one or more physical hardware components of computing device may be partitioned. In one or more embodiments, one partition of the plurality of partition may contain host operating system 128. In one or more embodiments, host operating system 128 may be used to manage hypervisor, instantiate virtual machines and the like. In one or more embodiments, host operating system 128 may operate on primary partition and/or a parent partition wherein virtual machines may operate on child partitions. In one or more embodiments, management of hypervisor may occur on host operating system 128. In one or more embodiments, one or more processes as described herein may occur on host operating system 128 prior to being implemented within child partitions.

With continued reference to FIG. 1, in a non-limiting example, when host operating system 128 is created, a pre-defined set of virtual hardware resources may be provided by virtualization layer 136, wherein the pre-defined set of virtual hardware resources may include, but is not limited to processor cores 104, portion of virtualized memory, virtual disks, virtual network interfaces, among others. As host operating system 128 attempts to execute one or more operations or access its "hardware," host operating system 128 may interface with virtualization layer 136, for instance, and without limitation, when virtual machine tries to use processor 104, it may be scheduled by hypervisor onto physical processor 104 on computing device through virtualization layer 136. In some cases, host operating system 128 may receive these resources as if they are dedicated hardware components, oblivious to the abstraction layer beneath. In some cases, virtualization layer 136 may handle I/O operations, translating virtual disk or network accesses to actual operations on the physical hardware. Any interruption, exception, or system call made by host operating system 128 may be intercepted by virtualization layer 136 which then communicates with hypervisor to handle or service that request.

With continued reference to FIG. 1, in some cases, a plurality of partitions may include at least a dedicated partition, wherein one or more I/O operations may be consolidated into the at least a dedicated partition. In some cases, such partition may include a specialized virtual machine that is configured to manage and handle I/O operations for other virtual machines, acting as an intermediary between plurality of partitions and/or quest virtual machines and physical hardware resources through an I/O physical bus e.g., a virtualized PCI bus that connects devices to main system. In a non-limiting example, at least a dedicated partition may include a I/O virtual machine containing a plurality of FACE I/O service segments (IOSS), wherein each IOSS may provide a standardized interface between OSS and platform-specific hardware. I/O virtual machine may be configured to manage all I/O operations in adherence to FACE technical standards as described above. In a non-limiting example, through plurality of IOSS, I/O virtual machine may include a virtual machine that interface directly with platform's avionic hardware connected to computing device in a way that is standardized across different air vehicles and systems. In some cases, standardized device drives and/or adapters may be provided by IOSS for various avionic devices. For example, when a quest virtual machine or a software application integrated into the system as described below wants to access a hardware resources, it may be configured to indirectly communicate with the I/O virtual machine, plurality of IOSS having standardized drivers for the hardware may process the request as per pre-defined system specification (e.g., FACE specification). In these cases, other partitions or virtual machines may be less susceptible to I/O-related faults or security breaches. Security protocols may be standardized and attach surface may be reduced by centralizing drivers and I/O operations since other virtual machines do not directly access I/O hardware, reducing potential vulnerabilities. In other cases, updates, or changes to one or more I/O device drivers or I/O related services may be done in I/O virtual machine without affecting or rebooting the rest of virtual machines.

With continued reference to FIG. 1, hypervisor may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU 124, network adapter, storage controllers, FPGA devices, audio processing cards, solid state drives and the like. In one or more embodiments, SR-IOV may allow for virtual machines to access a single physical device. In one or more embodiments, multiple virtual machines may have direct access to a physical device without an operating system 128 allocating resources. In one or more embodiments, SR-IOV may allow for the sharing of resources, such as for example network adapters, while still maintaining independence. In one or more embodiments, SR-IOV may allow for multiple virtual machines operating on a type 1 hypervisor to have access to physical devices without an intermediary such as a shot operating system 128. In one or more embodiments, computing devices may contain physical hardware that is capable of virtualization. In one or more embodiments, hypervisor may contain the proper systems and/or software to enable SR-IOV wherein each virtual machine may receive a virtual component. In one or more embodiments, SR-IOV may allow for one or more separate virtual environment 132 with direct access to one or more physical hardware components of computing device. In one or more embodiments, hypervisor may include one or more virtual binary unit system (BUS) adapters. A binary unit system adapter (BUS) for the purposes of this disclosure is a hardware component, such as a cable, that allow communication between one or more physical devices on computing device. In one or more embodiments, BUS adapters may include various physical hardware such as but not limited to, USB adapters, graphics card adapters, sound card adapter, network adapter and the like. "Virtual Bus adapter" for the purposes of this disclosure is a software that is configured to mimic a physical BUS adapter and provide a connection between one or more virtual machines and/or containers 140. For example, and without limitation, Virtual BUS may allow for communication between one or more virtual machines and a network card. In one or more embodiments, BUS adapters may be virtualized to allow for connection of one or more virtual machines to one or more physical devices. In one or more embodiments, virtual BUS may emulate various physical devices wherein one or more virtual machines may connect to the virtual BUS. In one or more embodiments, Virtual BUS may include virtualized versions of physical hardware wherein one or more virtual machines may communicate with the one or more virtualized versions and wherein the virtualized versions may then communicate with the physical hardware. In one or more embodiments virtual BUS adapters may allow for increased isolation between one or more virtual environment 132, wherein each virtual environment 132 is connected to a separate virtual BUS adapter.

With continued reference to FIG. 1, in a non-limiting example, the container architecture may be consistent with one or more aspects of the container architecture described in U.S. patent application Ser. No. 18/395,210, filed on Dec. 22, 2023, titled "SYSTEM AND METHOD FOR A SAFETY CRITICAL OPERATING ENVIRONMENT CONTAINER ARCHITECTURE," which is incorporated by reference herein in its entirety.

With continued reference to FIG. 1, in a non-limiting example, the container architecture may be consistent with one or more aspects of the container architecture described in U.S. patent application Ser. No. 18/443,540, filed on Feb. 16, 2024, titled "APPARATUS AND METHODS FOR A MISSION CRITICAL OPERATING ENVIRONMENT CONTAINER ARCHITECTURE," which is incorporated by reference herein in its entirety.

With continued reference to FIG. 1, generating the virtual environment 132 on the remote computing device 116 may be based on a determination of an initial resource allocation. An "initial resource allocation," as used in this disclosure, is an assignment and/or allocation of hardware resources such as processors, memory, and/or hardware modules 156 for use by one or more software modules 106, virtual machines, partitions, and/or containers as described in further detail below. An initial resource allocation may be designed and/or configured to provide resources to achieve one or mor operational and/or computational goals, for instance and without limitation as described below. Initial resource allocation may include a memory allocation 144, defined as an allocation of memory for a software module 106; memory allocated may include dynamically, statically, and/or randomly allocated memory, including registers, random-access memory, and/or any form of persistent memory as described in this disclosure.

With continued reference to FIG. 1, the initial resource allocation may include a core allocation 148. Without limitation, a "core allocation" is a resource allocation and/or initial resource allocation that includes a selection of one or more processor cores 104, e.g. to be used in a virtual environment 132 and/or for operation of a software module 106. A core allocation 148 may include at least a first core in a first processor and at least a second core in a second processor; for instance, one or more GPP 124 cores and/or GPP 124 cores and/or tensor cores may be required, useful, and/or instructed as necessary for performance of one or more tasks. As a non-limiting example, one or more GPU 124 cores and/or tensor cores may be used for highly parallel tasks such as matrix calculations, cryptographic and/or machine-learning or machine-learning training operations, video processing, or the like, while other tasks more amenable to flexibility of instruction sets or the like may be implemented using GPP 124 cores. Initial resource allocation may include a hardware allocation 152, defined as allocation and/or assignment of one or more peripheral, integrated, and/or communicatively connected hardware modules 156 and/or circuit elements, including without limitation any elements and/or modules that may be implemented on and/or with an FPGA and/or application-specific integrated circuit (ASIC); such hardware elements may include without limitation peripheral connections to sensors, analog to digital converters, digital to analog converters, serial to parallel converters, parallel to serial converters, signal processing units such as without limitations digital and/or analog filters, waveform generators, or the like, cryptographic units, and/or any other hardware element that may occur to persons skilled in the art upon reviewing the entirety of this disclosure.

Further referring to FIG. 1, determination of initial resource allocation may be accomplished by receiving an instruction specifying the initial resource allocation. For instance, software module 106 may include instructions within and/or packaged with software module 106 indicating an allocation of resources, such as a number of cores, a number of GPP 124 cores, a number of GPU 124 cores, a number of hardware modules 156 of one or more types, an amount of primary memory and/or secondary memory, or the like. Alternatively or additionally, at least a processor core 104 and/or operating system 128 may determine initial resource allocation by identifying a maximal performance requirement and determining the initial resource allocation based on the maximal performance requirement. A "maximal performance requirement," as used herein, is a maximum amount of a given computer resource that will be required to achieve an operational and/or computational objective of a software module 106 under "worst case" analysis. For instance, and without limitation, a maximal computational requirement may include a maximum number of clock cycles, instructions, or the like, for instance as calculated using "big O" notation, to perform a given algorithm for a software module 106; maximum computational requirement may also include a number of instructions and/or clock cycles that must be performed on one or more processors in a given amount of time to perform a given operation within the time required to do so, which might be established by a user instruction and/or instruction included with, packaged with, and/or embedded in software module 106 that specifies a required response time, frame rate, or the like for a given algorithm and/or step. A maximal performance requirement may alternatively or additionally include a maximal memory requirement, defined as a maximal performance requirement that identifies a maximal amount of memory needed to support a given algorithm and/or operational requirement; as an illustrative example, a maximal memory requirement may include an amount of cache space, an amount of RAM or other primary memory, an amount of virtual memory, and/or an amount of secondary and/or persistent memory that will be required under worst-case analysis to meet a requirement for performance of software module 106 and/or one or more algorithms thereof, which may be specified in any manner as described above for maximal computational requirements.

Alternatively or additionally, and still referring to FIG. 1, at least a processor core 104 and/or operating system 128 may determine initial resource allocation by identifying a probable performance requirement and determining the initial resource allocation based on the probable performance requirement. A "probable performance requirement," as used herein, is a maximum amount of a given computer resource that will be required to achieve an operational and/or computational objective of a software module 106 under a most likely or most probable use of resources. For instance, and without limitation, a probable computational requirement may include a probable number of clock cycles, instructions, or the like, for instance as calculated using "big O" notation, to perform a given algorithm for a software module 106; probable computational requirement may also include a number of instructions and/or clock cycles that must be performed on one or more processors in a given amount of time to perform a given operation within the time required to do so, which might be established by a user instruction and/or instruction included with, packaged with, and/or embedded in software module 106 that specifies a required response time, frame rate, or the like for a given algorithm and/or step. In some embodiments, initial resource allocation may be based on a padded probable resource requirement, which may, for instance, allocate computational and/or memory resources sufficient for a probable requirement plus an additional amount to account for potentially worse computation and/or memory use than in the most probable case. A probable performance requirement may alternatively or additionally include a probable memory requirement, defined as a probable performance requirement that identifies a probable amount of memory needed to support a given algorithm and/or operational requirement; as an illustrative example, a probable memory requirement may include an amount of cache space, an amount of RAM or other primary memory, an amount of virtual memory, and/or an amount of secondary and/or persistent memory that will be required under worst-case analysis to meet a requirement for performance of software module 106 and/or one or more algorithms thereof, which may be specified in any manner as described above for probable computational requirements.

Alternatively or additionally, and with further reference to FIG. 1, determining initial resource allocation may include identifying a redundancy requirement and determining the initial resource allocation based on the redundancy requirement. A "redundancy requirement," as used in this disclosure, is an amount of computational and/or memory resources required and/or usable to build redundancy into resources to be allocated for a software module 106, virtual environment 132, or the like. For instance, a redundancy requirement may specify that two copies of certain data to be stored in memory must be stored, so that if one copy becomes corrupted or otherwise compromised a second copy may be used instead of the first copy and/or to repair correct errors therein; as a non-limiting example, each memory word or other allotment may have a certain allocation of bits for error correction and/or error correction code storage and/or implementation, and redundant copies may provide ability to replace a give data word, sector, or the like with one that has no detected error, effectively increasing error correction abilities. Initial resource allocation may be performed according to either or both of a maximal performance requirement and a redundancy requirement.

Still referring to FIG. 1, the at least a processor 104 is configured to transmit an input for the software module 106 to the remote computing device 116. As used in this disclosure, an "input" is data or instructions sent to the software module 106 by the processor 104. In a non-limiting example, the input 160 may be in various forms, such as numerical data, text commands, sensor readings, user inputs, pre-configured parameters, and the like, depending on the nature of the software module 106 and the task it is meant to execute. In a non-limiting example, the software module 106 may be a data analytics tool, the input 160 may be a dataset that the software module 106 is tasked with analyzing. Continuing, the at least a processor 104 may send this dataset to the remote device, where the analysis would be carried out, and the results would then be transmitted back as output.

With continued reference to FIG. 1, the memory may further contain instructions configuring the at least a processor 104 to encrypt the input 160 transmitted to the remote computing device 116. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process May involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output. "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, software programs may include a time-varying software programs, which may have a time limit after which time-varying software programs is no longer valid. Time limit may be calculated from an initial time, which may be a datum linked to a particular timestamp or other value representing a fixed moment in time, associated with time-varying software programs; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

With continued reference to FIG. 1, receiving the output 164 of the software module 106 from the remote computing device 116 may include performing a trusted time evaluation of the output 164 by computing device. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a software programs is an authentic software programs that has the property of attested time. Generating a secure timestamp may be used to weed out spoofers or "man in the middle attacks".

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using software programs. Additional data may include one or more additional data, including the input 160 and the output 164, that are received and transmitted by the at least a processor 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g., a hash function, and this hashed output data is sent to a timestamping authority (TSA). The use of secure timestamps as described herein may enable systems and methods as described herein to instantiate attested time. Attested time is the property that a device incorporating a local reference clock may hash data, the input 160 and the output 164, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, the at least a processor 104 is further configured to monitor a quality datum of the output 164 of the software module 106 from the remote computing device 116 and conditionally reallocate the input 160 for the software module 106 to a second remote computing device 116. As used in this disclosure, a "quality datum" is an element of data that measures or assesses the performance of the output 164 generated by the software module 106 on the remote computing device 116. In a non-limiting example, the quality datum may include various metrics, such as correctness, efficiency, error rates, or other key performance indicators (KPIs) that help evaluate whether the output 164 meets the system's standards or expectations. Continuing, by monitoring the quality datum, the system may determine whether the current remote computing device 116 is performing adequately or if the task should be reallocated to a different device to ensure better results. In a non-limiting example, the at least a processor 104 may assess the quality datum by analyzing the correctness or completeness of the output 164 from the software module 106. For instance, without limitation, if the system is executing a data analysis task on the remote computing device 116, the at least a processor 104 may evaluate whether the output 164 meets specific accuracy thresholds or contains errors. Without limitation, if the quality datum reveals discrepancies or inefficiencies, the at least a processor 104 may decide to redirect the input 160 to another remote computing device 116 better suited for the task. Continuing, this monitoring of the remote computing device 116 performance may ensure that the system always maintains high performance and delivers reliable outputs.

In another non-limiting example, the at least a processor 104 may monitor performance-related quality metrics, such as the time taken to produce output or the computational efficiency of the remote computing device 116. For real-time applications like video processing, where delays may impact the effectiveness of the system, monitoring the latency and throughput as part of the quality datum may allow the at least a processor 104 to make quick adjustments. Continuing, if the remote computing device 116 is underperforming due to resource constraints or high latency, the at least a processor 104 may reallocate the task to another remote computing device 116 to avoid delays. Additionally and or alternatively, the quality datum may involve monitoring the resource usage of the remote computing device 116, such as CPU load or memory consumption. Continuing, if the current remote computing device 116 is overloaded or running at maximum capacity, the quality of the output 164 may degrade due to resource shortages. Continuing, in such cases, the at least a processor 104 may detect this through the quality datum and reallocate the input 160 to a second remote computing device 116 with more available resources, ensuring smoother and faster task execution. In a non-limiting example, in safety-critical environments, where the quality of the output 164 directly impacts decision-making, the at least a processor 104 may evaluate more stringent metrics like data integrity and system stability as part of the quality datum. For example, without limitation, in drone systems, the accuracy and reliability of flight data and navigation output may be critical. Continuing, the at least a processor 104 may continuously monitor the quality datum of the output 164 from the software module 106, ensuring that the drone's navigation, sensor data, or control systems meet the necessary safety and operational standards. Continuing, if any discrepancies or potential risks, such as incorrect flight path calculations or sensor malfunctions, are detected, the system may immediately reallocate the input 160 to another remote computing device 116, ensuring that the drone maintains stability and continues operating safely. Without limitation, the real-time adjustment may help prevent errors that could impact the drone's flight or mission.

With continued reference to FIG. 1, the at least a processor 104 may be configured to conditionally reallocate the input 160 for the software module 106 to the second remote computing device 116 when the quality datum of the remote computing device 116 meets a predefined specification. As used in this disclosure, a "predefined specification" is a set of criteria or standards that are established outlining the expected performance, quality, or operational requirements that a system, device, or output must meet. In a non-limiting example, the predefined specification may serve as benchmarks for evaluating whether a process or output is functioning correctly or whether a particular device meets the necessary conditions to continue processing tasks. Without limitation, the predefined specification may include latency thresholds, battery life, processing speeds, network bandwidth, memory availability, system temperature, security standards, reliability rating, spatial proximity, resource matching, and the like. Latency thresholds refer to predefined limits on the acceptable delay between sending and receiving data across a network. In systems requiring fast communication a threshold might be set to 50 milliseconds. Continuing, if the latency exceeds this threshold, the system may reallocate tasks to minimize delays. For example, a distributed computing task might shift from a high-latency node to a closer one to maintain real-time performance. Battery life defines the minimum operational time a remote computing device 116 must maintain without recharging. For example, in drones or mobile edge devices, maintaining battery life above a predefined threshold, such as 20%, may be crucial for continuous operation. Continuing, if a device's battery dips below this limit, tasks may be moved to another node to prevent shutdown mid-task. Processing speed refers to the rate at which a device can execute tasks. Without limitation, the processing speed may be measured in GHz or operations per second. For instance, a predefined threshold may require the remote computing device 116 to process a certain volume of data within a set time, such as processing 1 GB of data within 30 seconds. Continuing, in this example, if the remote computing device 116 cannot complete the task within the 30-second threshold due to lower processing speeds, the system may dynamically reallocate the task to another remote computing device 116 with faster processing capabilities, ensuring that the operation meets performance expectations. Network bandwidth defines the maximum data transfer rate a remote computing device 116 can handle. In a non-limiting example, the network bandwidth may be measured in Mbps or Gbps. If a node's bandwidth falls below a predefined specification, such as 100 Mbps, the task(s) may be reallocated to other remote computing device 116 to prevent bottlenecks and maintain smooth operation. Memory availability refers to the amount of free memory a remote computing device 116 has for task execution. In a nonlimiting example, in distributed databases or big data analytics, a remote computing device 116 may require at least 8 GB of memory to efficiently process large datasets. If memory resources are depleted, the task may be transferred to a node with more available memory to avoid crashes or slowdowns. System temperature measures the operating heat of a device. Without limitation, in high-performance computing clusters, the remote computing device 116 may maintain safe temperatures, such as under 80° C. Continuing, if the remote computing device 116 overheats, tasks may be redistributed to cooler nodes to prevent hardware damage and maintain processing stability. Security standards are predefined protocols or encryption levels required to safeguard data. For example, if the remote computing device 116 fails to meet the security requirements required by the system, the task(s) may be moved to remote computing device 116s with the necessary security protocols. Reliability ratings measure a remote computing device 116 uptime and performance history. In mission-critical applications, such as aerospace systems, tasks may be allocated to the remote computing device 116 with a high reliability rating. Continuing, if a node shows instability or frequent downtime, tasks may be reallocated to maintain continuous, reliable operation. Spatial proximity refers to the physical distance between nodes or between a node and the data source. In edge computing systems, nodes closer to the data source may be prioritized to minimize latency and improve performance. Continuing, if a remote device is too far away, tasks may be reassigned to a nearer node to enhance processing efficiency as previously discussed herein. Resource matching may ensure that tasks are allocated to devices with the necessary hardware resources. For example, AI model training might require a GPU 124, so tasks are allocated to nodes with the appropriate hardware. Continuing if a remote computing device 116 lacks the required resources, the task may be reallocated to a better-suited remote computing device 116 to ensure optimal performance. In a non-limiting example, the predefined specification in group computing systems may help ensure that each remote computing device 116 meets necessary standards for performance, synchronization, resource availability, and the like. Continuing, by monitoring the predefined specification through quality datum, the system may dynamically adjust, reallocate tasks, and optimize the collaborative effort across multiple nodes, ensuring the overall efficiency and stability of the group computing network.

Still referring to FIG. 1, the at least a processor 104 is configured to receive an output of the software module 106 from the remote computing device 116. As used in this disclosure, an "output" is the result or data produced by the software module 106 after processing the input 160. In a non-limiting example, the output 164 may be transmitted from the remote computing device 116 back to the processor 104, providing the final result or intermediate data that is used to inform further operations or decisions. Without limitation, the output 164 may be stored, displayed, used as an input for subsequent tasks, and the like. In a non-limiting example, the output 164 may take different forms, such as a dataset, report, computed value, graphical result, error messages, and the like, depending on the function of the software module 106. For example, without limitation, where the software module 106 is performing data analysis, the output 164 may include a summary report like a chart. Continuing, the at least a processor 104 may receive the output 164 and may display it to a user and/or utilize the output 164 for further processing or decision-making tasks.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
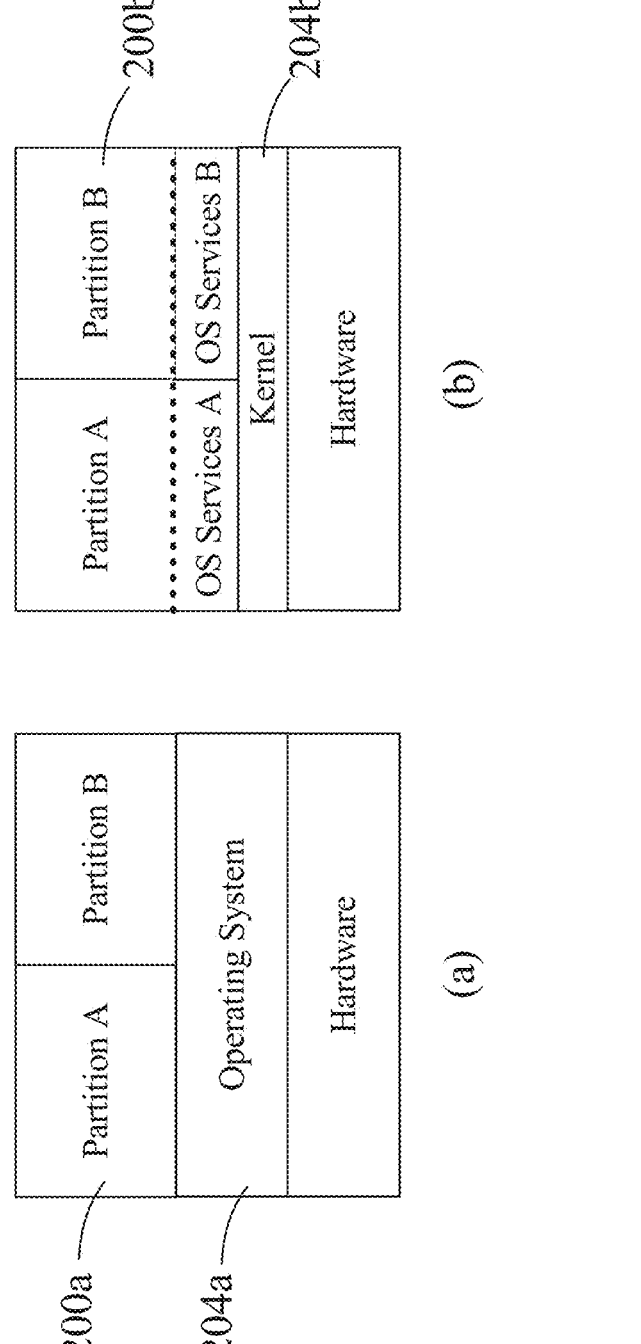
FIG. 2 is an exemplary embodiment of one or more system infrastructures.

Referring now to FIG. 2, an exemplary embodiment of one or more system infrastructures 200 is described. 'System infrastructure" for the purposes of this disclosure refers to a structure in which memory and/or storage devices are partitioned for use in virtual machines. In first system infrastructure 200a, an operating system 204a may sit atop the physical hardware of a computing device. In one or more embodiments, the operating system 204a may provide the means to partition and/or allocate memory within the operating system for use in one or more virtual machines. In one or more embodiments, first system infrastructure 200a may allow for a single operating system to manage one or more partitions. In one or more embodiments, virtual machines with first system infrastructure 200a must rely on the dependability of the host operating system 204a. In one or more embodiments, a type 2 hypervisor as described in FIG.

1, may be used to create one or more virtual machines atop the operation system 204a. In second system infrastructure 200b, one or more operating systems may communicate directly with physical hardware. In contrast to first system infrastructure 200a wherein one or more virtual machines must communicate with a host operating system 204a to receive resources, in second system infrastructure 200b, one or more virtual machines may communicate directly with the physical hardware of a computing device. In one or more embodiments, a kernel 204b may allocate resources to each operating system. In one or more embodiments, kernel may create a virtualization layer 136 as described in FIG. 1 to generate virtualized devices and allocate the virtualized devices to each operating system. In one or more embodiments, a partition created within second system infrastructure may be independent of other operating systems operating on the computing device.

Figure 3:
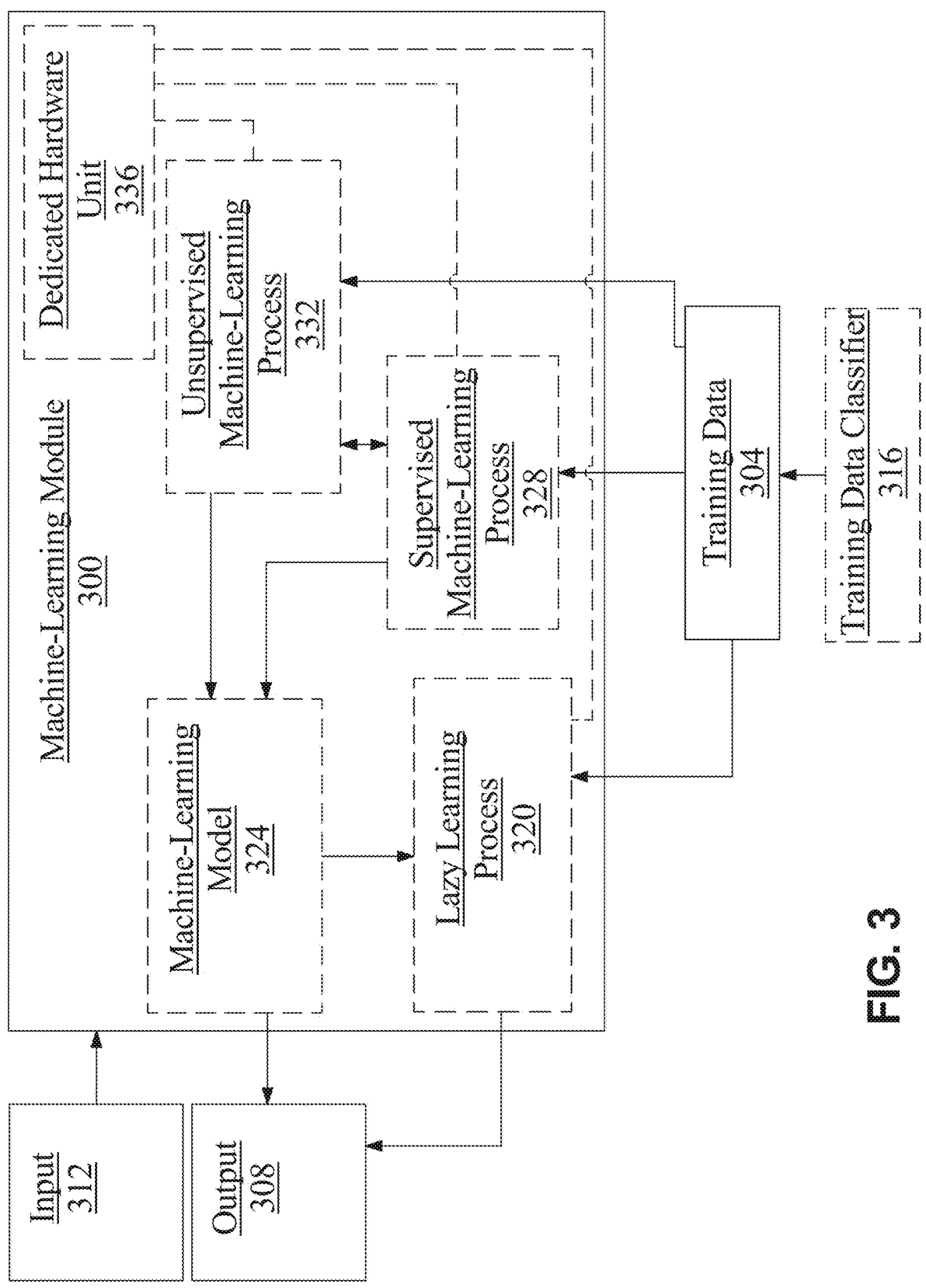
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs generated by software module and outputs may include outputs of software module. In one or more embodiments, machine learning module 300 may be self-contained wherein software container 140 may be portable. In one or more embodiment, training data and machine learning module 300 may be self-contained within software container 140 as described in reference to FIG. 1. In one or more embodiments, training data within software container 140 may be iteratively trained and saved within software container 140 for future iterations. In one or more embodiments, a self-contained machine learning model may allow decreased vulnerability. In one or more embodiments, training data and/or machine learning models contained within a database may be compromised and create incorrect outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to subclasses within software module.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs of software module as described above as inputs, outputs of software module as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores 104, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
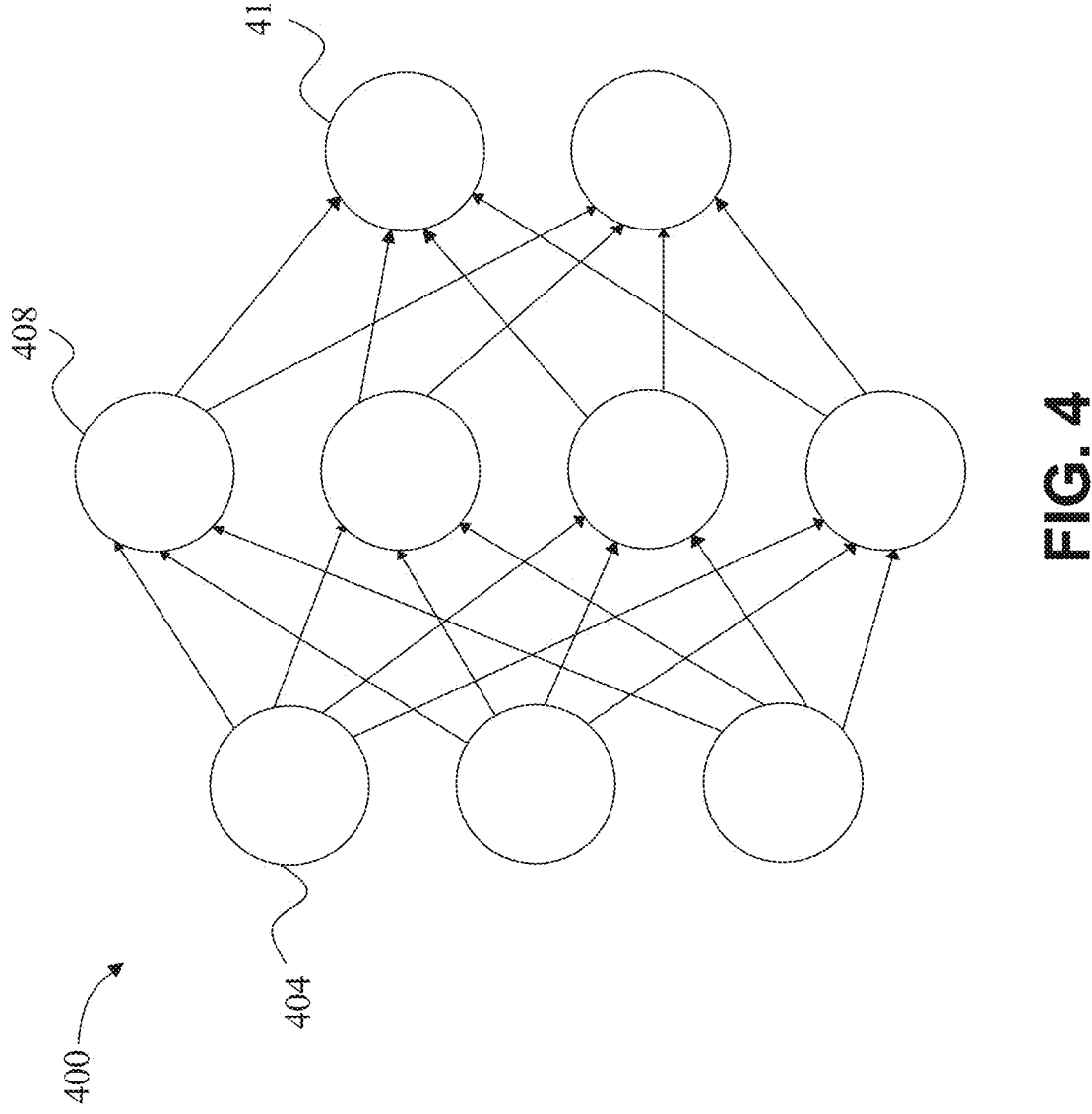
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
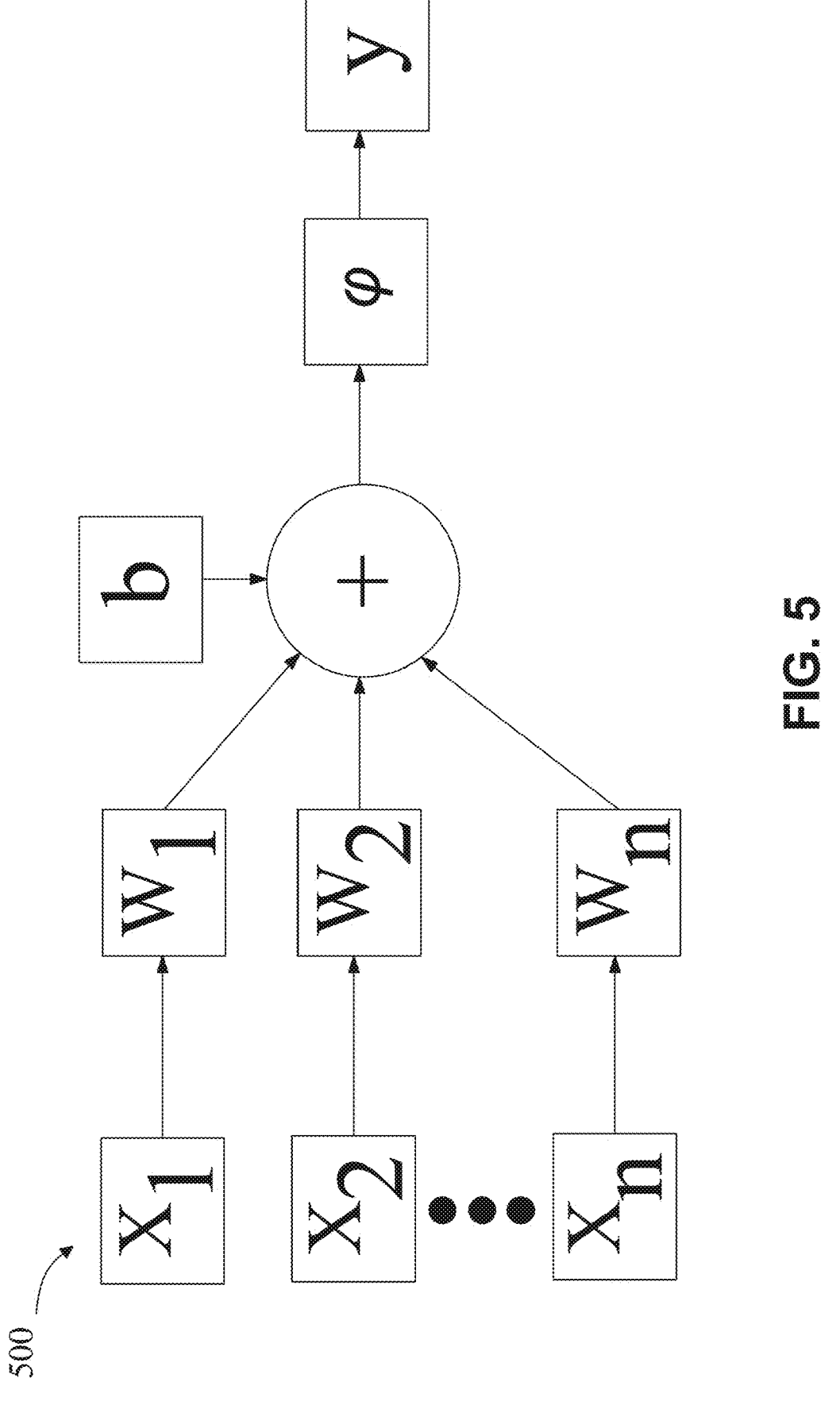
FIG. 5 is a diagram of an exemplary embodiment of a node of a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
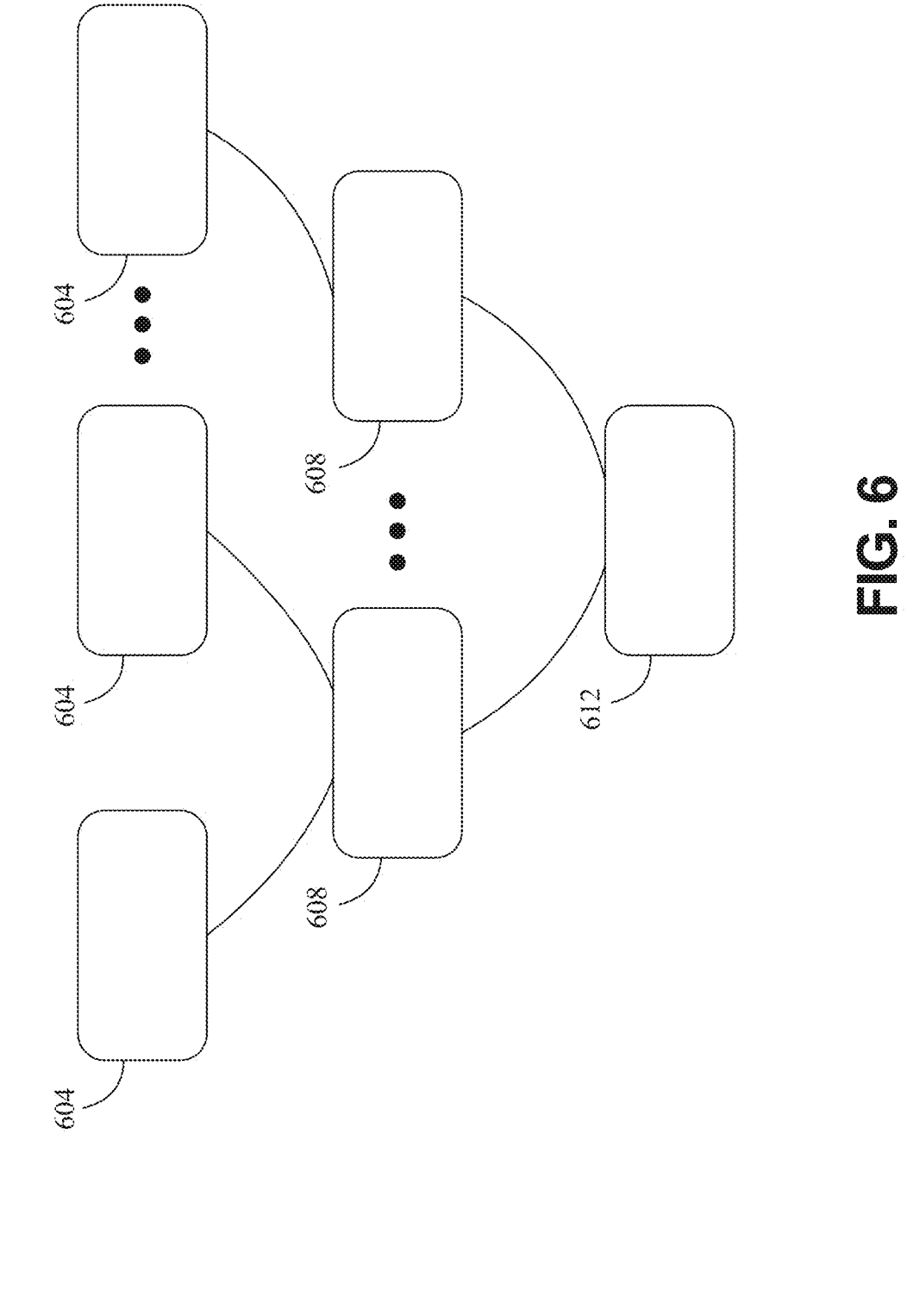
FIG. 6 is a diagram of an exemplary embodiment of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are created using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6 cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Referring now to FIG. 7, a flow diagram of an exemplary method 700 for assigning group computational tasks in a safety-critical environment is illustrated. At step 705, method 700 includes receiving, using at least a processor, an identification of a software module to be executed. This may be implemented as described and with reference to FIGS. 1-6.

Still referring to FIG. 7, at step 710, method 700 includes communicatively connecting, using the at least a processor, to a remote computing device. This may be implemented as described and with reference to FIGS. 1-6.

Still referring to FIG. 7, at step 715, method 700 includes configuring, using the at least a processor, the remote computing device to instantiate the software module within a virtual environment executing on the remote computing device. This may be implemented as described and with reference to FIGS. 1-6.

Still referring to FIG. 7, at step 720, method 700 includes transmitting, using the at least a processor, an input for the software module to the remote computing device. This may be implemented as described and with reference to FIGS. 1-6.

Still referring to FIG. 7, at step 725, method 700 includes receiving, using the at least a processor, an output of the software module from the remote computing device. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
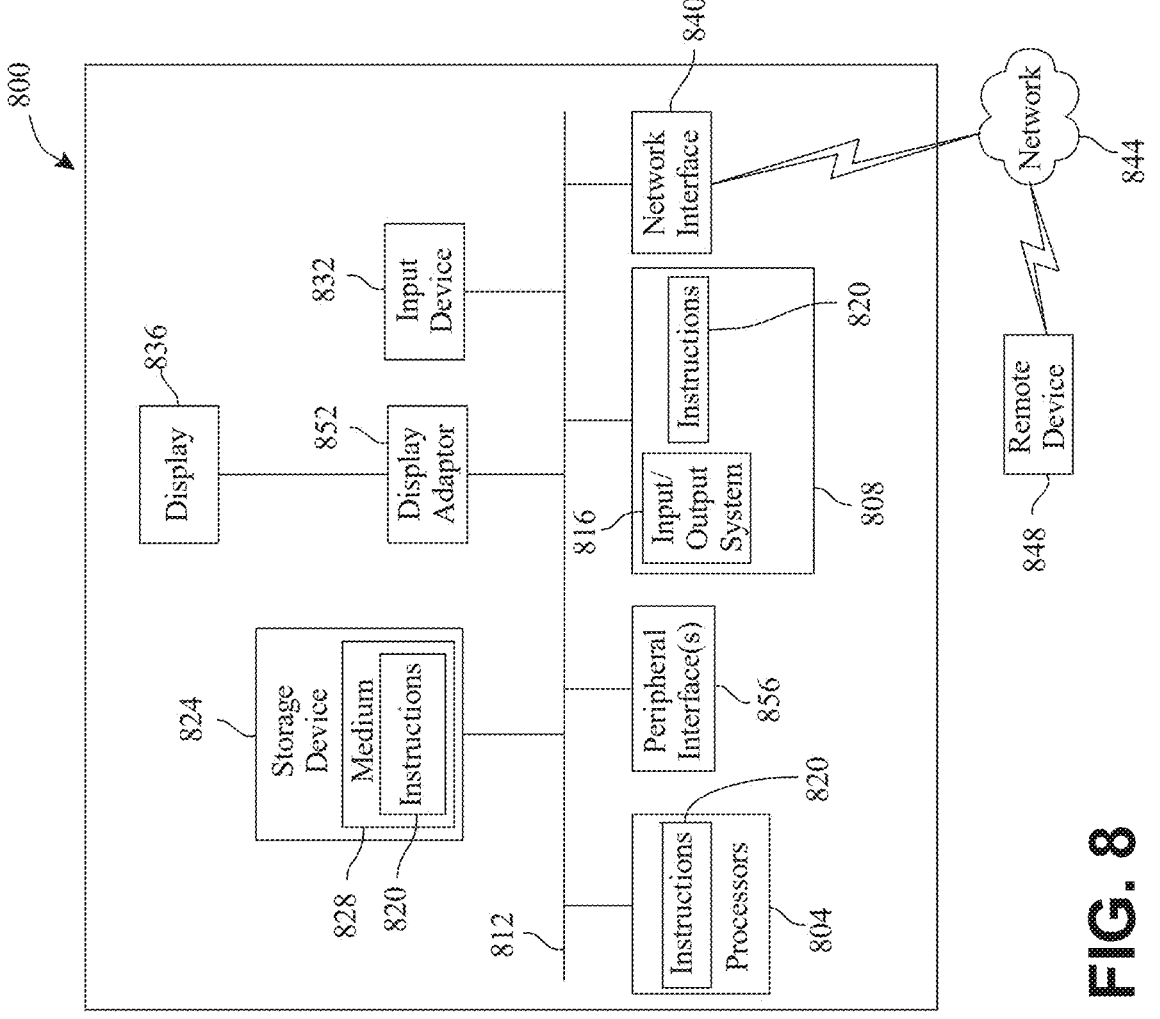
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for assigning group computational tasks in a safety-critical environment, wherein the apparatus comprises:
at least a processor; and
a memory communicatively connected to the at least a processor, wherein the memory contains instructions configuring the at least a processor to:
receive an identification of a software module to be executed;
continuously measure a first latency datum associated with at least a first remote computing device;
monitor the first latency datum as a function of fluctuating network conditions;
receive a second latency datum associated with at least a second remote computing device;
communicatively connect to the at least a second remote computing device, wherein the second latency datum comprises a lower latency than the first latency datum and wherein communicatively connecting to the at least a second remote device comprises:
prioritizing the second latency datum over the first latency datum based on a comparison of the first latency datum and the second latency datum; and
shifting from the at least a first remote computing device to the at least a second remote computing device as a function of the prioritizing of the second latency datum, wherein the shifting occurs prior to transmitting an input to the at least a second remote computing device;
configure the at least a second remote computing device to instantiate the software module, wherein the software module comprises a hypervisor within a virtual environment executing on the at least a second remote computing device, wherein the virtual environment comprises a virtual machine, and wherein the hypervisor is configured to virtualize input output resources;

transmit the input for the software module to the at least a second remote computing device; and
receive an output of the software module from the at least a second remote computing device.

2. The apparatus of claim 1, wherein generating the virtual environment on the remote computing device is based on a determination of an initial resource allocation.

3. The apparatus of claim 2, wherein the initial resource allocation comprises a core allocation.

4. The apparatus of claim 1, wherein connecting to the remote computing device is based on a spatial datum.

5. The apparatus of claim 1, wherein connecting to the remote computing device is based on latency datum.

6. The apparatus of claim 1, wherein the remote computing device comprises a vehicle-based computing unit.

7. The apparatus of claim 1, wherein the remote computing device comprises a hypervisor configured to:
host at least a virtual machine within the virtual environment of the remote computing device;
dynamically allocate at least a resource from the at least a virtual machine based on a plurality of requirements of the input for the software module; and
manage an execution of the at least a virtual machine of the remote device.

8. The apparatus of claim 1, wherein the memory further contains instructions configuring the at least a processor to encrypt the input transmitted to the remote computing device.

9. The apparatus of claim 1, wherein the at least a processor is further configured to:
monitor a quality datum of the output of the software module from the remote computing device; and
conditionally reallocate the input for the software module to a second remote computing device.

10. The apparatus of claim 9, wherein the at least a processor is configured to conditionally reallocate the input for the software module to the second remote computing device when the quality datum of the remote computing device meets a predefined specification.

11. A method for assigning group computational tasks in a safety-critical environment, wherein the method comprises:
receiving, using at least a processor, an identification of a software module to be executed;
continuously measuring, using the at least a processor, a first latency datum associated with at least a first remote computing device;
monitoring the first latency datum as a function of fluctuating network conditions;
receiving a second latency datum associated with at least a second remote computing device;
communicatively connecting, using the at least a processor, to the at least a second remote computing device, wherein the second latency datum comprises a lower latency than the first latency datum and wherein communicatively connecting to the at least a second remote device comprises:
prioritizing the second latency datum over the first latency datum based on a comparison of the first latency datum and the second latency datum; and
shifting from the at least a first remote computing device to the at least a second remote computing device as a function of the prioritizing of the second latency datum, wherein the shifting occurs prior to transmitting an input to the at least a second remote computing device;

configuring, using the at least a processor, the at least a second remote computing device to instantiate the software module, wherein the software module comprises a hypervisor, within a virtual environment executing on the at least a second remote computing device, wherein the virtual environment comprises a virtual machine, and wherein the hypervisor is configured to virtualize input output resources;

transmitting, using the at least a processor, the input for the software module to the at least a second remote computing device; and receiving, using the at least a processor, an output of the software module from the at least a second remote computing device.

12. The method of claim 11, wherein generating the virtual environment on the remote computing device is based on a determination of an initial resource allocation.

13. The method of claim 12, wherein the initial resource allocation comprises a core allocation.

14. The method of claim 11, wherein connecting to the remote computing device is based on a spatial datum.

15. The method of claim 11, wherein connecting to the remote computing device is based on latency datum.

16. The method of claim 11, wherein the remote computing device comprises a vehicle-based computing unit.

17. The method of claim 11, wherein the remote computing device comprises a hypervisor configured to:

host at least a virtual machine within the virtual environment of the remote computing device;

dynamically allocate at least a resource from the at least a virtual machine based on a plurality of requirements of the input for the software module; and manage an execution of the at least a virtual machine of the remote device.

18. The method of claim 11, wherein the input is encrypted, using the at least a processor, before transmission to the remote computing device.

19. The method of claim 11 further configured to:

monitor a quality datum of the output of the software module from the remote computing device; and conditionally reallocate the input for the software module to a second remote computing device.

20. The method of claim 19, further configured to conditionally reallocate the input for the software module to the second remote computing device when the quality datum of the remote computing device meets a predefined specification.

* * * * *